US010296122B1

(12) United States Patent
Zeng et al.

(10) Patent No.: US 10,296,122 B1
(45) Date of Patent: May 21, 2019

(54) TOUCH DISPLAY PANEL

(71) Applicants: Interface Technology (ChengDu) Co., Ltd., Sichuan (CN); Interface Optoelectronics (ShenZhen) Co., Ltd., Guangdong (CN); General Interface Solution Limited, Miaoli County (TW)

(72) Inventors: Jhe-Wei Zeng, Guangdong (CN); Fa-Lin Liu, Guangdong (CN); Po-Lin Chen, Guangdong (CN)

(73) Assignees: INTERFACE TECHNOLOGY (CHENGDU) CO., LTD., Sichuan (CN); INTERFACE OPTOELECTRONICS (SHENZHEN) CO., LTD., Guangdong (CN); GENERAL INTERFACE SOLUTION LIMITED, Miaoli County (TW)

( * ) Notice: Subject to any disclaimer, the term of this patent is extended or adjusted under 35 U.S.C. 154(b) by 0 days.

(21) Appl. No.: 15/834,073

(22) Filed: Dec. 7, 2017

(30) Foreign Application Priority Data

Nov. 3, 2017 (CN) .......................... 2017 1 1069883

(51) Int. Cl.
*G06F 3/041* (2006.01)
(52) U.S. Cl.
CPC .. *G06F 3/0412* (2013.01); *G06F 2203/04102* (2013.01); *G06F 2203/04103* (2013.01); *G06F 2203/04111* (2013.01)

(58) Field of Classification Search
USPC .................................................. 345/170–176
See application file for complete search history.

(56) References Cited

U.S. PATENT DOCUMENTS

| | | | |
|---|---|---|---|
| 2013/0002572 A1* | 1/2013 | Jin ..................... | G02F 1/133305 345/173 |
| 2014/0253477 A1* | 9/2014 | Shim ..................... | G06F 3/0487 345/173 |
| 2015/0049260 A1* | 2/2015 | Yashiro ................... | G06F 3/044 349/12 |
| 2015/0062028 A1* | 3/2015 | Go ........................ | G06F 1/1616 345/173 |
| 2016/0062516 A1* | 3/2016 | Jeong ..................... | G06F 3/044 345/174 |
| 2017/0013731 A1* | 1/2017 | Lee ........................ | H04B 1/3888 |
| 2018/0128973 A1* | 5/2018 | Powell ..................... | G02B 6/06 |

* cited by examiner

*Primary Examiner* — Tony O Davis
(74) *Attorney, Agent, or Firm* — CKC & Partners Co., LLC

(57) ABSTRACT

A touch display panel is provided. The touch display panel includes a cover and a touch sensing layer. The cover has a touch-sensing section, a first bending section, and a first side section. The first side section and the touch-sensing section are not coplanar and the first bending section is located between the touch-sensing section and the first side section. The touch sensing layer is located under the cover and includes a first metal mesh layer and a second metal mesh layer. Only one of the first metal mesh layer and the second metal mesh layer is located under the first bending section.

9 Claims, 4 Drawing Sheets

100

TOUCH DISPLAY PANEL

CROSS-REFERENCE TO RELATED APPLICATION

This application claims priority to China Application Serial Number 201711069883.1, filed Nov. 3, 2017, which is herein incorporated by reference.

BACKGROUND

Field of Invention

The present invention relates to a touch display device. More particularly, the present invention relates to a touch display device having false triggering prevention feature.

Description of Related Art

Nowadays, border design of smart devices has progressed rapidly, and the conventional two-dimensional right angle border design has progressed into a three-dimensional curved border design. The curved border design has a special visual effect, but the stacking structure in the device has to be designed under several limitations. For example, since the curved sides of the device are also visible, the touch sensing layer and relative modules will be exposed on the curved sides, and it is not possible to hide them in a nontransparent conventional side border.

A method to overcome the above problem is to bend the touch sensing layer with the curved border, and further attach the touch sensing layer behind the display layer, as such the touch sensing layer and the relative modules may be hidden behind the display layer. However, when a user holds the smart device, the area between the thumb and the forefinger is used to hold the border of the smart device, the touch sensing layer located at the curved border is likely to be undesirably triggered, i.e., a false triggering, which severely affects the user experience. In summary, it is an important issue to solve the false triggering problem of a curved border design of a touch device in the art.

SUMMARY

The invention provides a touch display panel. The touch display panel includes a cover and a touch sensing layer. The cover has a touch-sensing section, a first bending section, and a first side section. The first side section and the touch-sensing section are not coplanar and the first bending section is located between the touch-sensing section and the first side section. The touch sensing layer is located under the cover and includes a first metal mesh layer and a second metal mesh layer. Only one of the first metal mesh layer and the second metal mesh layer is located under the first bending section.

In some embodiments, the first metal mesh layer and the second metal mesh layer are made of a nontransparent conductive metal.

In some embodiments, a longitudinal direction of the first side section is substantially perpendicular to a longitudinal direction of the touch-sensing section.

In some embodiments, the touch-sensing section is in a first plane, wherein an orthogonal projection of the first bending section and the first side section on the first plane has a width smaller than 5 mm.

In some embodiments, the cover further includes a second bending section and a second side section in which that the second side section is opposite to the first side section, and the second bending section is located between the touch-sensing section and the second side section, and in which that only one of the first metal mesh layer and the second metal mesh layer is located under the first bending section.

In some embodiments, the touch sensing layer further includes a touch substrate layer. The first metal mesh layer and the second metal mesh layer are located at two opposite sides of the touch substrate layer respectively.

In some embodiments, the touch display panel further includes a liquid crystal module. The touch sensing layer is located between the liquid crystal module and the cover.

In some embodiments, an optical clear adhesive layer is disposed between the cover and the touch sensing layer.

In some embodiments, the touch display panel further includes a liquid crystal module. The liquid crystal module is disposed under the touch sensing layer, and an optical clear adhesive layer is disposed between the liquid crystal module and the touch sensing layer.

In some embodiments, the touch sensing layer is made by a coating process or an optical lithography.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
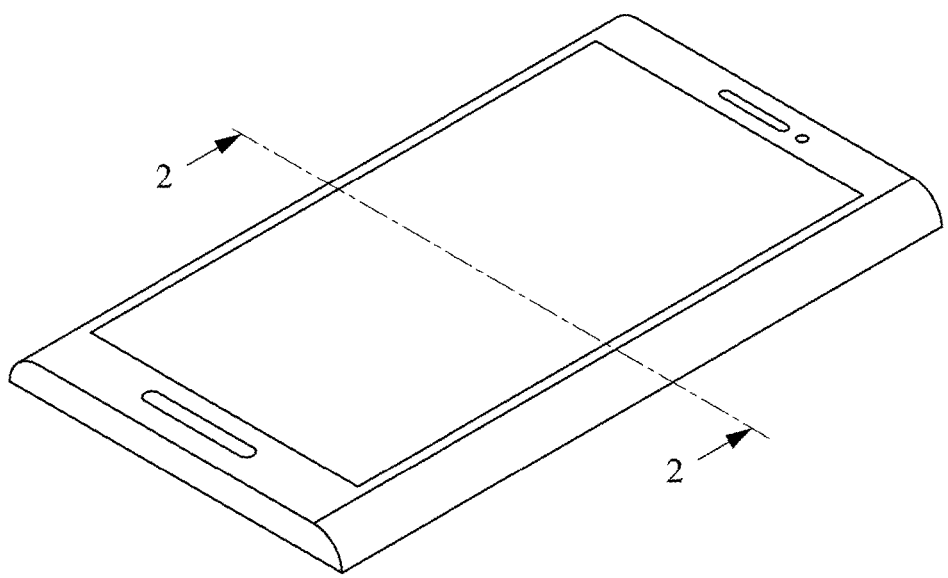
FIG. 1 illustrates a perspective view of a touch display panel according to an embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

Reference is made to FIG. 1. FIG. 1 illustrates a perspective view of a touch display panel 100 according to an embodiment of the present disclosure. The touch display panel 100 has a curved border design, which may grant the user to hold the touch display panel 100 with more comfort, and improve the overall visual effect of the touch display panel 100.

Figure 2:
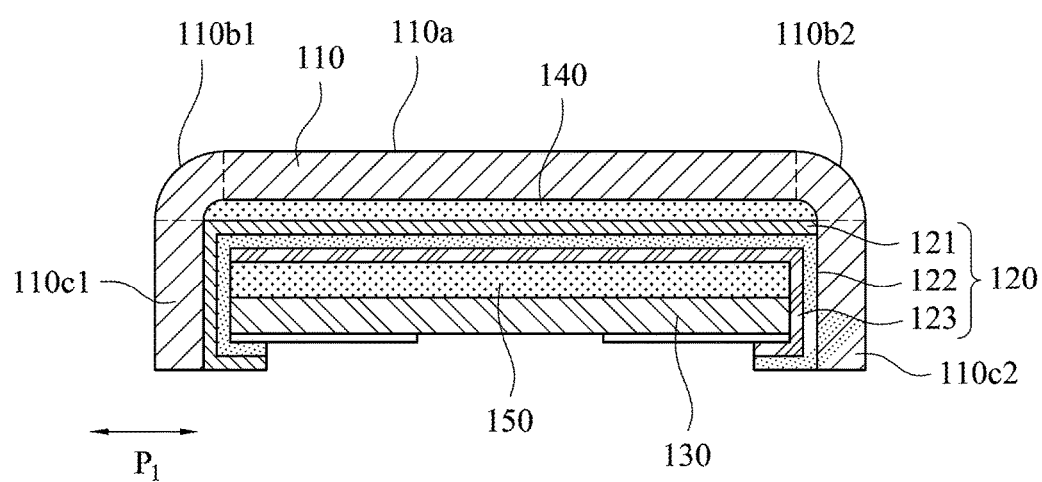
FIG. 2 illustrates a cross-sectional view of the touch display panel taken along line 2-2 in FIG. 1.

Reference is made to FIG. 2. FIG. 2 illustrates a cross-sectional view of the touch display panel 100 taken along line 2-2 in FIG. 1.

As shown in FIG. 2, the touch display panel 100 includes a cover 110, a touch sensing layer 120, and a liquid crystal module 130.

As shown in FIG. 2, the cover 110 includes a touch-sensing section 110a, a first bending section 110b1, a first side section 110c1, a second bending section 110b2, and a second side section 110c2. A longitudinal direction of the touch-sensing section 110a is parallel to a plane P1, and a longitudinal direction of the first side section 110c1 is perpendicular to plane P1. In other words, the first side section 110c1 and the touch-sensing section 110a are not coplanar. The first bending section 110b1 is connected between the touch-sensing section 110a and the first side section 110c1.

In the embodiment shown in FIG. 2, in particular, the first bending section 110b1 is defined from a location where the touch-sensing section 110a start to bend to a location where the longitudinal direction of the cover 110 is perpendicular to the plane P1. In the embodiment of FIG. 2, an orthogonal projection of the first bending section 110b1 on the plane P1 has a width smaller 5 mm (referring to FIG. 3, the orthogonal projection of the first bending section 110b1 and the first side section 110c1 on the plane P1 has a width W). It should be understood that, the first bending section 110b1 is defined as a bending section located between the touch-sensing section 110a and the first side section 110c1 in the present embodiment. However, the first bending section 110b1 may also be referred as a section where is likely to be falsely triggered, and thus the first bending section 110b1 may be defined as such instead of strictly limiting its physical position. In the present embodiment, the second bending section 110b2 and the second side section 110c2 of the cover 110 are substantially symmetric to the first bending section 110b1 and the first side section 110c1, and thus not repeat herein.

As shown in FIG. 2, the touch sensing layer 120 is located under the cover 110, and the touch sensing layer 120 and the cover 110 are attached to each other by an optical clear adhesive layer 140. The touch sensing layer 120 includes a first metal mesh layer 121, a touch substrate layer 122, and a second metal mesh layer 123. The first metal mesh layer 121 and the second metal mesh layer 123 are located at two opposite sides of the touch substrate layer 122 respectively. In the embodiment of FIG. 2, the touch sensing layer 120 is bent with the cover 110, and a portion of the touch sensing layer 120 is further bent behind the liquid crystal module 130.

As shown in FIG. 2, the first metal mesh layer 121 and the second metal mesh layer 123 are both located under the touch-sensing section 110a which is under the cover 110. When a user press an area in the touch-sensing section 110a of the cover 110, the first metal mesh layer 121 and the second metal mesh layer 123 will generate some electric property changes in the corresponding area, and the electric property changes will be transformed into signals which will be sent to a processor (not shown), so as to allow the processor obtain the location information of the pressing area.

In the embodiment of FIG. 2, the first metal mesh layer 121 is also located under the first bending section 110b1 and the first side section 110c1. Since the second metal mesh layer 123 is not located under the first bending section 110b1 and the first side section 110c1, if a user presses an area in the first bending section 110b1 or the first side section 110c1, the first metal mesh layer 121 is unable to generate electric property changes with the second metal mesh layer 123, and thus there would be no signals transmitted to the processor. By only disposing the first metal mesh layer 121 under the first bending section 110b1 and the first side section 110c1, when the user holds a side (for example, the side with the first bending section 110b1 and the first side section 110c1) of the touch display panel 100, the common false triggering problem may be prevented.

In the embodiment of FIG. 2, the second metal mesh layer 123 is located under the second bending section 110b2 and the second side section 110c2. Since the first metal mesh layer 121 is not located under the second bending section 110b2 and the second side section 110c2, if a user presses an area in the second bending section 110b2 or the second side section 110c2, the second metal mesh layer 123 is unable to generate electric property changes with the first metal mesh layer 121, and thus there would be no signals transmitted to the processor. By only disposing the second metal mesh layer 123 under the second bending section 110b2 and the second side section 110c2, when the user holds a side (for example, the side with the second bending section 110b2 and the second side section 110c2) of the touch display panel 100, the common false triggering problem may be prevented.

In some embodiments, the first metal mesh layer 121 is only located under the first bending section 110b1 and not located under the first side section 110c1. The second metal mesh layer 123 is only located under the second bending section 110b2 and not located under the second side section 110c2. As such, there is no metal mesh layer under the first side section 110c1 and the second side section 110c2, so there will be no signals transmitted to the processor even if the user press the first side section 110c1 or the second side section 110c2 by mistake, and thus the false triggering problem may also be prevented.

In some embodiments, the first metal mesh layer 121 and the second metal mesh layer 123 are reversely disposed. That is to say, the first metal mesh layer 121 is located under the second bending section 110b2 and under the second side section 110c2, and the second metal mesh layer 123 is located under the first bending section 110b1 and under the first side section 110c1. In other words, by disposing only one of the first metal mesh layer 121 and the second metal mesh layer 123 at two opposite sides of the touch display panel 100, the false triggering problem may be prevented.

In some embodiments, the first metal mesh layer 121 and the second metal mesh layer 123 may be made of a non-transparent conductive metal, such as gold, silver, copper, or any other suitable conductive metal material. The touch sensing layer 120 may be manufactured by a coating process or an optical lithography process. It should be understood that, the first metal mesh layer 121 and the second metal mesh layer 123 may be disposed symmetrically at opposite sides of the touch substrate layer 122, such that similar manufacturing processes may be adopted to manufacture the first metal mesh layer 121 and second metal mesh layer 123 (for example, using the same mask in the optical lithography process). As such, the manufacturing process of the touch sensing layer 120 is simplified.

As shown in FIG. 2, the liquid crystal module 130 is disposed under the touch sensing layer 120, and the liquid crystal module 130 and the touch sensing layer 120 are attached to each other by an optical clear adhesive layer 150. By the disposition of the liquid crystal module 130, colorful images may be displayed on the touch-sensing section 110a of the touch display panel 100. In other embodiments, different display module may be implemented. For example, an organic light-emitting diode display module may be implemented.

Figure 3:
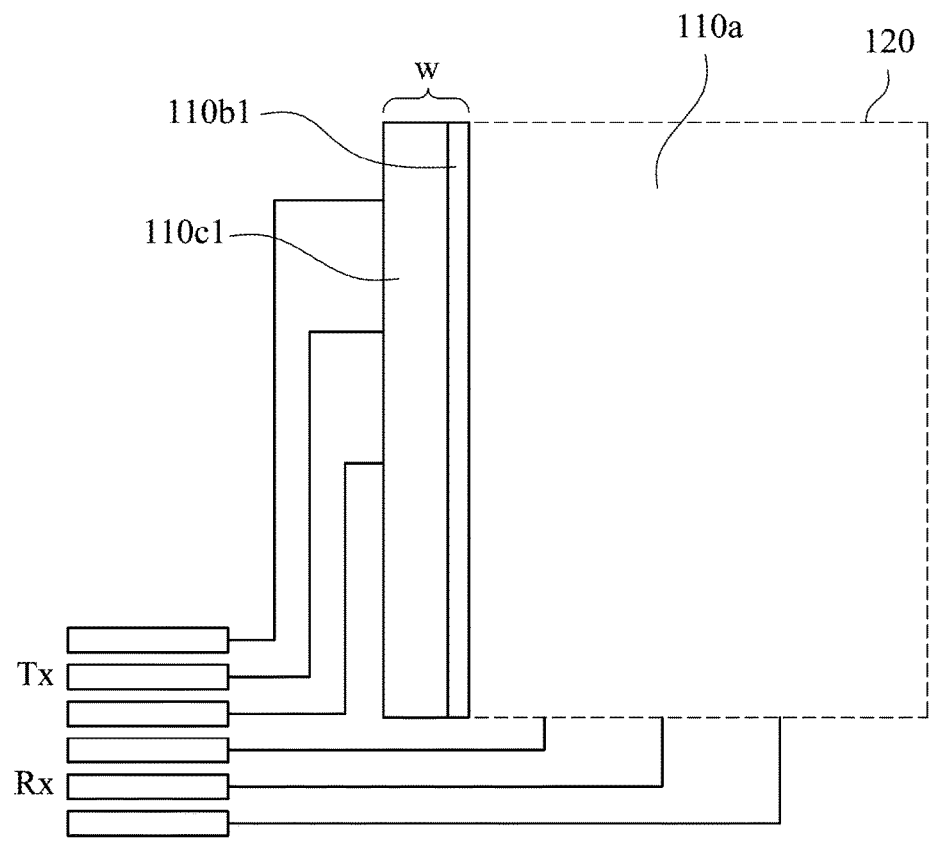
FIG. 3 illustrates a partial schematic view of the cover and the touch sensing layer shown in FIG. 2.
Figure 4A:
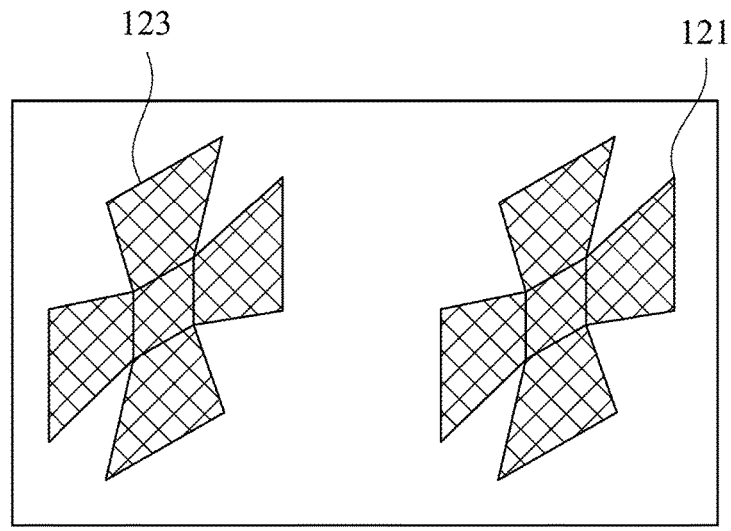
FIG. 4A illustrates a schematic view of the touch sensing layer under the touch-sensing section shown in FIG. 3.
Figure 4B:
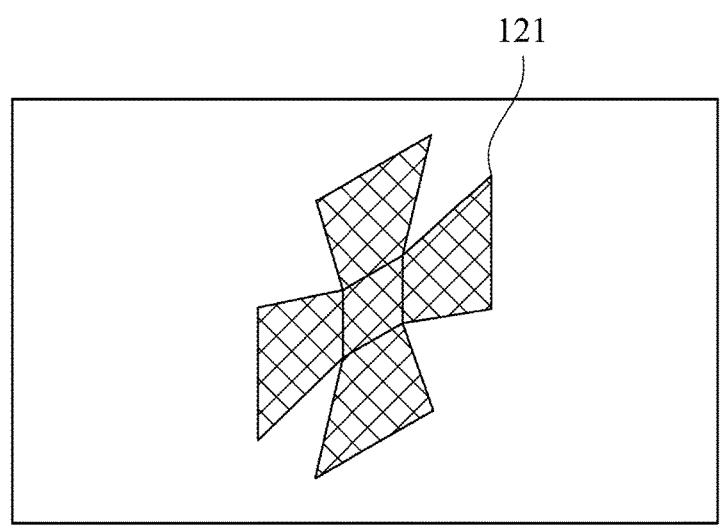
FIG. 4B illustrates the touch sensing layer under the first bending section and the first side section shown in FIG. 3.

Reference is made to FIG. 3, FIG. 4A, and FIG. 4B. FIG. 3 illustrates a partial schematic view of the cover 110 and the touch sensing layer 120 shown in FIG. 2. FIG. 4A illustrates a schematic view of the touch sensing layer 120 under the touch-sensing section 110a shown in FIG. 3. FIG. 4B illustrates the touch sensing layer 120 under the first bending section 110b1 and the first side section 110c1 shown in FIG. 3. In particular, only a projection of the first bending section 110b1, the first side section 110c1, and a portion of the touch-sensing section 110a on the plane P1 is illustrated, and the electrode wiring under the first bending section 110b1, the first side section 110c1, and a portion of the touch-sensing section 110a is only schematically illustrated. The second bending section 110b2 and the second side section 110c2 are not illustrated.

As shown in FIG. 3 and FIG. 4A, the touch sensing layer 120 located under the touch-sensing section 110a includes the first metal mesh layer 121 and the second metal mesh layer 123 at the same time. And as shown in FIG. 3 and FIG. 4B, the touch sensing layer 120 located under the first bending section 110b1 and the first side section 110c1 only includes the first metal mesh layer 121.

As shown in FIG. 3, in some embodiments, the first metal mesh layer 121 is connected to several receiving electrodes Rx, and the second metal mesh layer 123 is connected to several transmitting electrodes Tx. When a user presses the touch display panel 100, the first metal mesh layer 121 and the second metal mesh layer 123 will generate electric property changes at the pressed area, transform them into electric signals, and transmit the signals to a corresponding receiving electrode Rx and a corresponding transmitting electrode Tx according to the pressed area. Then the processor (not shown) may obtain the location information of the pressed area according to the receiving electrode Rx and the transmitting electrode Tx correspondingly.

The present disclosure is described with reference to FIG. 1 to FIG. 4B, people with ordinary skill in the art may implement the touch display panel 100 provided in the present disclosure according to the description. It should be understood that, several changes and variations may be made without departing from the spirit and scope of the present disclosure, and some alternative embodiments are exampled as follows.

As shown in FIG. 1, there is curved borders design at borders of the touch display panel 100 along line 2-2 (that is to say, the left side and the right side of the touch display panel 100 are both designed with a curved border). In some embodiments, borders of the touch display panel 100 along a line perpendicular to line 2-2 may also be implemented with the same design (that is to say, the upside and the downside of the touch display panel 100 are both designed with a curved border).

In some embodiments, four sides of the touch display panel 100 may be designed with a curved border arbitrarily, and may be implemented with the touch sensing layer 120 design provided by the present disclosure. For example, only one side of the touch display panel 100 is designed with a curved border, and the other three sides are each designed with a conventional right angle border. Since there are less false triggering problems of a conventional right angle border design, a touch sensing layer with a conventional design may be adopted. On the other hand, the curved border may adopt the touch sensing layer 120 design provided by the present disclosure, to solve the false triggering problems.

In some embodiments, when opposite two sides are both designed with a curved border, the first metal mesh layer 121 may be designed to be located under the first bending section 110b1, the first side section 110c1, the touch-sensing section 110a, the second bending section 110b2, and the second side section 110c2 at the same time, and the second metal mesh layer 123 is designed to be only located under the touch-sensing section 110a. The above design is able to prevent the false triggering problems as well. One may change the location of the first metal mesh layer 121 and the second metal mesh layer 123 according to practical needs.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A touch display panel, comprising:
   a cover having a touch-sensing section, a first bending section, a second bending section, a first side section, and a second side section, wherein the first side section and the touch-sensing section are not coplanar and the first bending section is located between the touch-sensing section and the first side section, and the second side section is opposite to the first side section, and the second bending section is located between the touch-sensing section and the second side section; and
   a touch sensing layer located under the cover and comprising a first metal mesh layer and a second metal mesh layer, wherein only one of the first metal mesh layer and the second metal mesh layer is located under a curved portion of the first bending section, and only one of the first metal mesh layer and the second metal mesh layer is located under the second bending section.

2. The touch display panel of claim 1, wherein the first metal mesh layer and the second metal mesh layer are made of a nontransparent conductive metal.

3. The touch display panel of claim 1, wherein a longitudinal direction of the first side section is substantially perpendicular to a longitudinal direction of the touch-sensing section.

4. The touch display panel of claim 1, wherein the touch-sensing section is in a first plane, wherein an orthogonal projection of the first bending section and the first side section on the first plane has a width smaller than 5 mm.

5. The touch display panel of claim 1, wherein the touch sensing layer further comprises a touch substrate layer, the first metal mesh layer and the second metal mesh layer are located at two opposite sides of the touch substrate layer respectively.

6. The touch display panel of claim 1, further comprising a liquid crystal module, wherein the touch sensing layer is located between the liquid crystal module and the cover.

7. The touch display panel of claim 1, wherein an optical clear adhesive layer is disposed between the cover and the touch sensing layer.

8. The touch display panel of claim 1, further comprising a liquid crystal module, the liquid crystal module is disposed under the touch sensing layer, and an optical clear adhesive layer is disposed between the liquid crystal module and the touch sensing layer.

9. The touch display panel of claim 1, wherein the touch sensing layer is made by a coating process or an optical lithography.

* * * * *